(12) United States Patent
Caruso et al.

(10) Patent No.: US 9,879,653 B2
(45) Date of Patent: Jan. 30, 2018

(54) POWER MANAGEMENT SYSTEM

(75) Inventors: Silvestro Caruso, London (GB);
Martin Jakubowski, London (GB);
Luciano Caioli, London (GB)

(73) Assignee: Condor Wind Energy Limited, London (GB)

(*) Notice: Subject to any disclaimer, the term of this patent is extended or adjusted under 35 U.S.C. 154(b) by 967 days.

(21) Appl. No.: 14/116,488

(22) PCT Filed: May 10, 2012

(86) PCT No.: PCT/IB2012/001015
§ 371 (c)(1),
(2), (4) Date: Apr. 11, 2014

(87) PCT Pub. No.: WO2012/153185
PCT Pub. Date: Nov. 15, 2012

(65) Prior Publication Data
US 2014/0217742 A1 Aug. 7, 2014

Related U.S. Application Data

(60) Provisional application No. 61/484,800, filed on May 11, 2011.

(51) Int. Cl.
G05D 3/12 (2006.01)
G05D 5/00 (2006.01)
G05D 9/00 (2006.01)
G05D 11/00 (2006.01)
G05D 17/00 (2006.01)
F03D 7/04 (2006.01)
(Continued)

(52) U.S. Cl.
CPC ............ *F03D 7/043* (2013.01); *F03D 1/065* (2013.01); *F03D 1/0608* (2013.01); *F03D 7/0204* (2013.01); *F03D 7/0212* (2013.01); *F03D 7/0272* (2013.01); *F03D 7/0276* (2013.01); *F03D 7/04* (2013.01); *F03D 7/042* (2013.01); *F05B 2270/1016* (2013.01); *F05B 2270/20* (2013.01); *Y02E 10/721* (2013.01); *Y02E 10/723* (2013.01)

(58) Field of Classification Search
None
See application file for complete search history.

(56) References Cited

U.S. PATENT DOCUMENTS 4,435,646 A 3/1984 Coleman et al.
4,439,105 A 3/1984 Hohenemser
(Continued)

FOREIGN PATENT DOCUMENTS

CN 201771692 U 3/2011
DE 20205396 U1 11/2002
(Continued)

OTHER PUBLICATIONS

National Instruments, Wind Turbine Control Methods, National Instruments, Dec. 22, 2008, 4 pages.*
(Continued)

*Primary Examiner* — Diem Cao
(74) *Attorney, Agent, or Firm* — Themis Law

(57) ABSTRACT

Systems for increasing the power productivity of two bladed teetering hinge, yaw controlled wind turbines by varying rotor shaft restraining torque and yaw angle.

7 Claims, 5 Drawing Sheets

(51) Int. Cl.
*F03D 1/06* (2006.01)
*F03D 7/02* (2006.01)

(56) References Cited

U.S. PATENT DOCUMENTS

| | | | |
|---|---|---|---|
| 4,565,929 A | 1/1986 | Baskin et al. | |
| 4,703,189 A | 10/1987 | DiValentin et al. | |
| 4,815,936 A * | 3/1989 | Stoltze | F03D 7/0212 416/13 |
| 6,361,275 B1 | 3/2002 | Wobben | |
| 6,420,795 B1 | 7/2002 | Mikhail et al. | |
| 2002/0047277 A1 | 4/2002 | Willis et al. | |
| 2003/0068104 A1 | 4/2003 | Loftus | |
| 2004/0151584 A1 | 8/2004 | Blakemore | |
| 2006/0070435 A1 | 4/2006 | LeMieux et al. | |
| 2010/0133827 A1 | 6/2010 | Huang et al. | |
| 2010/0203983 A1 | 8/2010 | Stites | |
| 2010/0226772 A1 | 9/2010 | Deering | |
| 2011/0049903 A1 * | 3/2011 | Jorgensen | F03D 7/0224 290/55 |
| 2011/0084485 A1 * | 4/2011 | Miranda | F03D 7/0224 290/44 |
| 2011/0089694 A1 * | 4/2011 | Arinaga | F03D 7/0224 290/44 |
| 2011/0137474 A1 * | 6/2011 | Larsen | F03D 7/0284 700/287 |
| 2012/0078518 A1 * | 3/2012 | Krishna | G06Q 10/04 702/3 |
| 2012/0104753 A1 * | 5/2012 | Nakashima | F03D 7/0284 290/44 |
| 2012/0112458 A1 * | 5/2012 | Numajiri | F03D 7/0204 290/44 |
| 2013/0257051 A1 * | 10/2013 | Spruce | F03D 7/028 290/44 |
| 2014/0212288 A1 | 7/2014 | Jakubowski et al. | |
| 2014/0217238 A1 | 8/2014 | Jakubowski et al. | |
| 2014/0217742 A1 | 8/2014 | Caruso et al. | |
| 2014/0219796 A1 | 8/2014 | Caruso et al. | |
| 2014/0226926 A1 | 8/2014 | Caruso et al. | |

FOREIGN PATENT DOCUMENTS

| | | |
|---|---|---|
| EP | 0995904 A2 | 4/2000 |
| EP | 1134410 A1 | 9/2001 |
| EP | 1890034 A1 | 2/2008 |
| EP | 2128431 A2 | 12/2009 |
| EP | 2302206 A1 | 3/2011 |
| GB | 2107794 A | 5/1983 |
| JP | 2006-207502 A | 8/2006 |
| WO | 2002/079647 A1 | 10/2002 |
| WO | 2009/080047 A2 | 7/2009 |
| WO | 2009/132671 A2 | 11/2009 |
| WO | 2010/072190 A2 | 7/2010 |
| WO | 2010/128378 A2 | 11/2010 |
| WO | 2011/042369 A2 | 4/2011 |
| WO | 2012/150502 A1 | 11/2012 |
| WO | 2012/150502 A4 | 11/2012 |
| WO | 2012/153185 A1 | 11/2012 |
| WO | 2012/153197 A2 | 11/2012 |
| WO | 2012/153197 A3 | 11/2012 |
| WO | 2012/153197 A4 | 11/2012 |
| WO | 2012/160446 A2 | 11/2012 |
| WO | 2012/160446 A3 | 11/2012 |
| WO | 2012/160446 A4 | 11/2012 |
| WO | 2012/164387 A1 | 12/2012 |
| WO | 2012/164387 A4 | 12/2012 |
| WO | 2013/027127 A4 | 12/2012 |
| WO | 2013/027127 A2 | 2/2013 |

OTHER PUBLICATIONS

Carlin et al., 2001, The History and State of the Art of Variable-Speed Wind Turbine Technology, National Renewable Energy Laboratory, (68 pages).
IEA Wind 1989 Annual Report.
IEA Wind 1990 Annual Report.
IEA Wind 1992 Annual Report.
IEA Wind LS WECS 1988 Annual Report.
IEA Wind LS WECS 1989 Annual Report.
International Preliminary Search Report on Patentability for PCT/IB2012/001015 with the date of issuance of dated Nov. 12, 2013, (8 pages).
International Preliminary Search Report on Patentability for PCT/IB2012/001041 with the date of issuance of dated Nov. 5, 2013, (14 pages).
International Preliminary Search Report on Patentability for PCT/IB2012/001106 with the date of issuance of dated Dec. 2, 2013, (10 pages).
International Preliminary Search Report on Patentability for PCT/IB2012/001118 with the date of issuance of dated Nov. 26, 2013, (13 pages).
International Preliminary Search Report on Patentability for PCT/IB2012/001183 with the date of issuance of dated Nov. 12, 2013, (14 pages).
International Preliminary Search Report on Patentability for PCT/IB2012/002704 with the date of issuance of dated Nov. 12, 2013, (15 pages).
Wind Stats Report 2011.

* cited by examiner

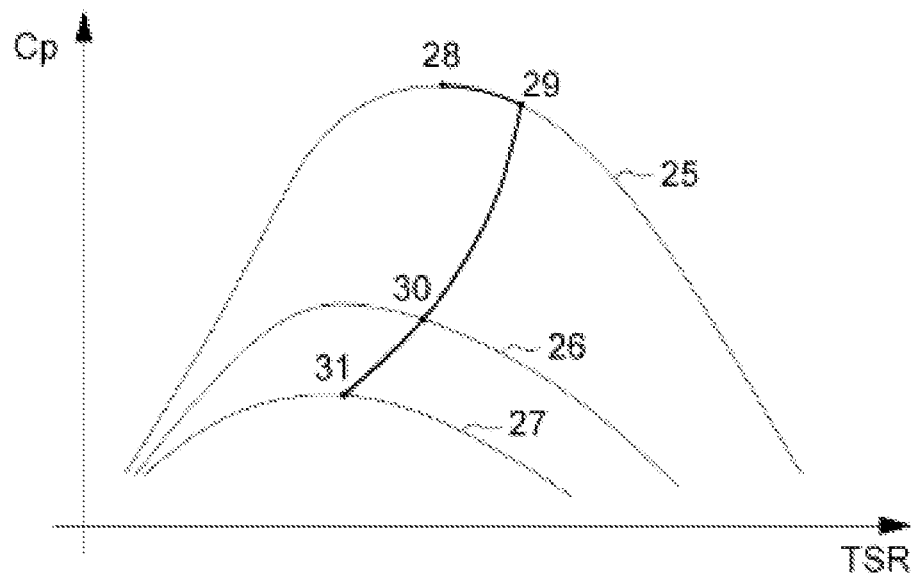
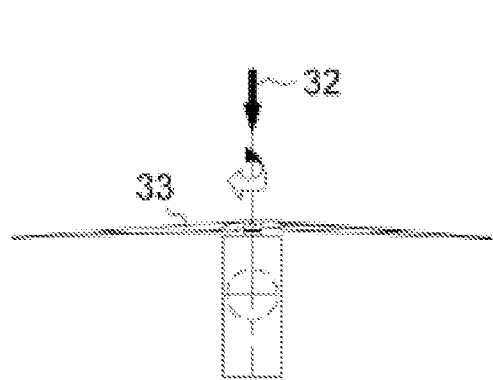
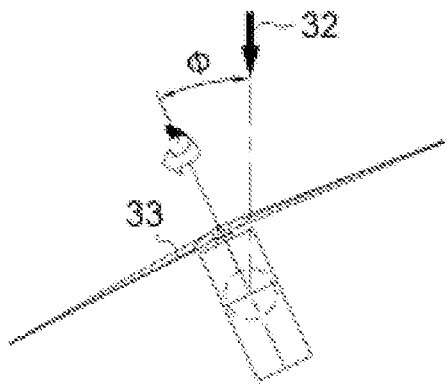

Sensed Power< Quasi Rated Power

Quasi Rated Power < Sensed Power < Rated Power

Rated Power < Sensed Power ≤ Max Power

POWER MANAGEMENT SYSTEM

REFERENCE TO RELATED APPLICATIONS

This application claims priority to U.S. Provisional Application No. 61/484,800, filed May 11, 2011, the contents of which is incorporated herein in its entirety.

FIELD OF THE INVENTION

The invention generally relates to power management of yaw controlled wind turbines.

BACKGROUND

Most three-bladed and two-bladed turbines are equipped with a yaw system to be able to change the orientation of the rotor axis in order to follow the wind direction and ensure that the rotor faces into the wind, thereby maximizing power production. Most three-bladed and two-bladed turbines modulate the pitch of the rotor blades to control the speed of the turbine and hence the power output of the turbine, as well as for shutdown. In most instances, wind turbines work at partial or whole variable rotor speed between the cut-in and the rated wind speed, while after the rated wind speed, the controller keeps the power and the running speed constant.

In two-bladed wind turbines, it is possible to yaw the turbine into or out of the wind also to control the speed of the turbine, and hence the power output of the turbine, without any need of pitch control. This is possible where the two-bladed turbine uses a teetering hinge (or "see-saw" hinge) to attach the turbine blades to the drive train of the turbine. The teetering hinge gives the rotor an additional degree of freedom, allowing the turbine to overcome gyroscopic forces, and to modulate the yaw angle sufficiently quickly to control the rotor speed of the turbine. By controlling the rotor speed of the turbine other than the rotor torque, it is possible to optimize power also when the wind speed is greater than the rated wind speed (i.e., the wind speed at which the turbine produces the max possible power when the turbine is facing into the wind (at zero yaw angle)).

At lower than rated wind speed, yaw control is used to keep the turbine facing into the wind, while the shaft torque is modulated to get the rotor work at its max aerodynamic efficiency irrespectively of the variations of the wind speed. In other words, when the wind speed is lower than the rated speed, the turbine is kept facing into the wind and the power, which is produced at highest efficiency, rises and falls with wind speed.

SUMMARY

This patent application discloses certain techniques for maximizing power productivity of two bladed teetering hinge, yaw controlled wind turbines with a full variable speed control strategy. Using the disclosed systems, the rotor torque and the yaw of the rotor can be varied to maximize electrical production over a range of wind speeds.

The control system of a two-bladed teetering hinged, yaw controlled turbine is based on two interconnected control loops: the first loop, which controls the restraining electrical torque through the electrical inverter, and a second loop, which controls the yaw angle between the rotor axis and the wind direction through the yaw motors. The control system, with its software, allows the turbine to operate, from the turbine management stand point, at any combination of torque and running speed. The invention requires the implementation of a proper control strategy by a tailored software in order to increase the rotor running speed even beyond the rated speed and thus to increase the power output of the turbine, without increasing the rotor torque above its rated value In one aspect, the invention includes a power control system for optimizing power production from a yaw controlled wind turbine. The power control system is coordinated by a controller which activates a yaw actuation subsystem and a drivetrain restraining torque subsystem. The controller receives inputs of a sensed output power, a sensed rotor running speed and a sensed wind direction relative to the rotor axis direction, and determines an optimal operational mode. The controller directs the yaw actuation subsystem and the drivetrain restraining torque subsystem to modify the operating conditions of the turbine based upon changes in the sensed output power, the sensed rotor running speed, and the sensed wind direction relative to the rotor axis direction. In an embodiment, the controller compares the sensed output power to a quasi-rated power, a rated power, and a max power to determine a preferred operational mode. The controller allows the turbine to maximize power production.

In another aspect, the invention includes a power management system for a yaw controlled wind turbine. The power management system comprises a power sensor capable of sensing the output power of the turbine, a rotor running speed sensor capable of measuring a speed of a rotor shaft of the wind turbine, a yaw angle sensor capable of measuring the angle between the wind direction and the rotor axis direction, a power converter operably coupled to the rotor shaft and capable of applying the desired restraining torque on the rotor shaft, a yaw actuating subsystem operably coupled to the rotor shaft and capable of rotating the rotor shaft axis thereby changing the yaw angle, and a controller. The controller is operably connected to the power sensor, the power converter, the yaw actuating subsystem, and the rotor running speed sensor and yaw angle sensor. The controller receives signals indicative of output power, the speed of the rotor shaft, and, optionally, the yaw angle. Upon receiving these signals, the controller determines an optimal operating mode for the turbine and outputs signals to change the restraining torque and/or the yaw angle as needed.

Using the systems and methods described herein, the power output as well as the energy production from a two-bladed teetering hinged, yaw controlled wind turbine can be maximized. In addition, the invention allows a two-bladed teetering hinged, yaw controlled turbine to operate at speeds in excess of the rotor rated speed. By operating at greater than rotor rated speed, the turbine can produce more energy without the need to up-size the rotor and the drive train. That is, only the electrical system has to be dimensioned in accordance with the increased power output. The design reduces the overall cost for a rated power, as compared to other wind turbines of similar rated power.

BRIEF DESCRIPTION OF THE DRAWINGS

FIG. 5 shows the relationship between wind power captured by the turbine and tip speed ratio (TSR) for different operational modes.

FIG. 6 is an illustration of a turbine operating into the wind with a yaw angle of zero.

FIG. 7 is an illustration of a turbine operating out of the wind with a yaw angle of cp.

DETAILED DESCRIPTION

Figure 1:
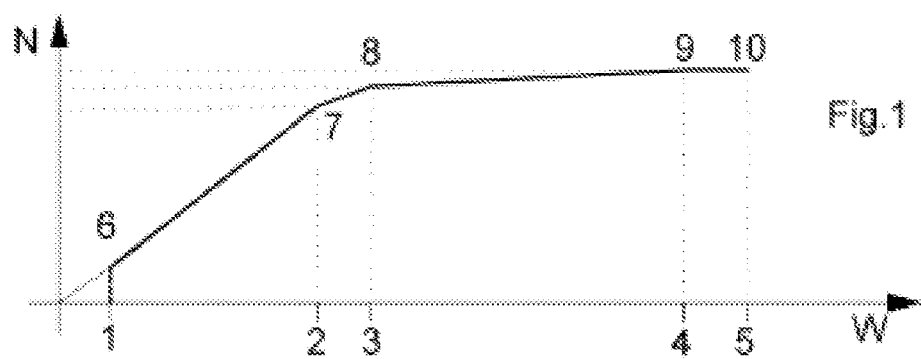
FIG. 1 shows the dependence of rotor running speed on wind speed in four conceptual performance modalities.

The invention refers to two-bladed teetering hinge, yaw control, upwind turbines. In a two-bladed teetering hinge, yaw control wind turbine, the power is controlled by yawing the rotor out of the wind when the wind speed is higher than rated. Two-bladed, teetering hinged, yaw controlled wind turbines have blades jointed rigidly to the hub, without the interposition of bearings and pitch mechanisms. These wind turbines, in order to obtain the highest rotor efficiency, have to use blades with high chord and thickness. They can therefore work at variable speed not only from cut-in to rated wind speed, but also beyond rated wind speed towards cut-out with a control logic, which is the object of this invention. Operating these two-bladed wind turbines at higher running speed beyond rated wind speed is beneficial not only for the productivity but also for limiting the maximum amplitude of the teetering angle at high power levels. The higher is the running speed the lower is the teetering amplitude of the hinge. The clearance between the blade tip and the tower is increased and further margin on the design life of the teetering hinge is achieved.

In two-bladed, teetering hinge, yaw control turbines, the blades are rigidly jointed to the hub, and the latter is coupled to the shaft through a hinge whose axis is perpendicular to the shaft axis. The degree of freedom introduced by the hinge, although this has a torsional stiffness≠0, dramatically reduces the gyroscopic loads of the turbine; thus the yaw torque needed to actuate the necessary yaw rate, and consequent acceleration, is limited. Further reduction of the yaw torque is achievable by a proper combination between the position of an up-wind rotor in respect to the wind direction and the direction of the shaft running speed.

The invention is applicable to two-bladed, teetering hinged, yaw controlled turbines which can withstand high running speed. The invention is typically executed via a controller, which may contain reference logic—based upon predefined key parameters like the quasi-rated power, the rated power, the max power, the rated rotor running speed, the max rotor running speed and the rated drive train restraining torque—and may receive operational inputs from the turbine sensors. The controller may be a central processing unit with memory and input and output interfaces, e.g., a personal computer. The controller may be connected to a network, e.g., the internet or a wireless or satellite network.

Conceptually, the power management system operates in four modalities, depending upon the wind speed, described in FIGS. 1-5: 1) From cut-in to quasi-rated wind speed, with the rotor into the wind, and at blade Tip Speed Ratio (TSR) corresponding to the maximum efficiency of capturing the incident wind energy; 2) From quasi-rated wind speed to rated wind speed, with the rotor into the wind and at rated torque; 3) From rated wind speed to quasi-cut-out, with rotor out of the wind, and at rated torque, gradually increasing running speed and power; 4) From quasi-cut-out to cut-out, with the rotor out of the wind, at rated torque and at running speed constant, thus power constant unless the effects of turbulence.

Figure 2:
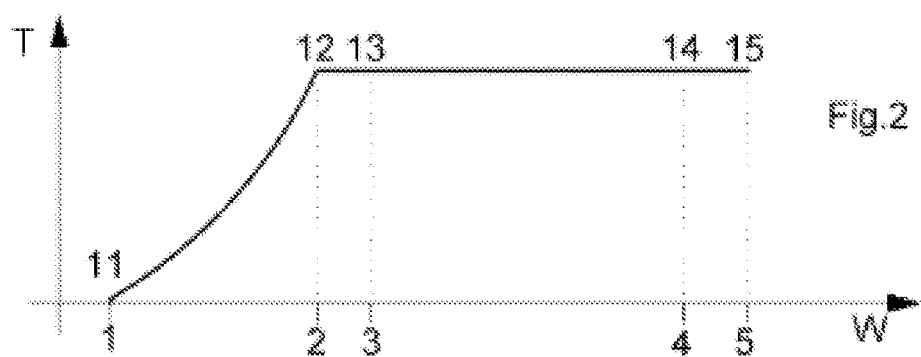
FIG. 2 shows the dependence of rotor torque on wind speed in four conceptual performance modalities.
Figure 3:
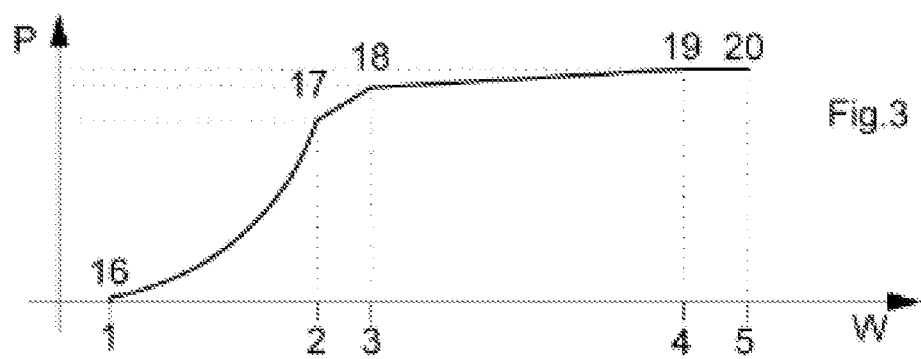
FIG. 3 shows the dependence of output power on wind speed in four conceptual performance modalities.
Figure 4:
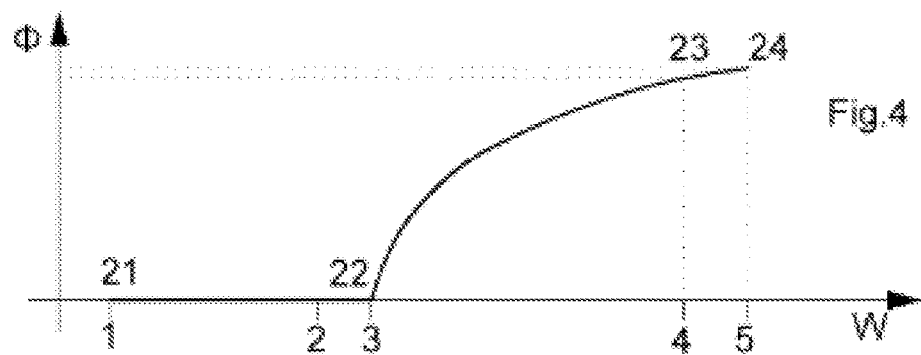
FIG. 4 shows the dependence of yaw angle on wind speed in four conceptual performance modalities.

The four modalities are further described below, with reference to FIGS. 1-7, which describe the operation of the turbine with respect to the wind speed and direction. FIG. 1 is a conceptual graph of rotor running speed versus wind speed. FIG. 2 is a conceptual graph of rotor torque versus wind speed. FIG. 3 is a conceptual graph of output power versus wind speed. FIG. 4 is a conceptual graph of yaw angle versus wind speed.

FIG. 5 is a graph of the efficiency of the rotor in capturing the wind power versus blade tip speed ratio (TSR), i.e., the velocity of the tip of the blade divided by the actual velocity of the wind, and versus yaw angle, being the curve 25 corresponding to zero yaw angle and the curves 26, 27 to higher values of the yaw angle. Because of the shaping of the blades, the top of the optimum Cp versus TSR curve (25), corresponding to the rotor into the wind (zero yaw angle), is made quasi flat. As a result, the efficiency is little penalized by the transient fluctuations in wind speed and thus in TSR, e.g., due to turbulence. At high wind speed, higher than rated, the incident wind power is higher than the power corresponding to the size of the turbine. Thus the turbine is yawed to reduce the efficiency of the rotor. The change in the yaw angle is illustrated as movement between points 22 and 23 in FIG. 4. As a consequence of the changes, the operational curve in FIG. 5 shifts down, e.g., from 25 to 26 to 27, as the yaw angle increases.

FIG. 6 shows operation of the turbine into the wind, i.e., yaw angle is zero and shaft speed is lower than or equal to rated shaft speed. FIG. 7 shows operation of the turbine off axis from the wind, i.e., yaw angle greater than zero and shaft speed between max shaft speed and rated shaft speed.

Conceptual Modalities

Modality 1:

(Corresponds to the regions between points 1 and 2 on the x-axis of FIGS. 1-4.) When the wind speed is between cut-in and quasi-rated speed, the turbine controller keeps the rotor 33 (FIG. 6) into the wind 32 (FIG. 6), i.e., at zero yaw angle, and modulates the running speed proportionally to the wind speed. In this modality the blade tip speed ratio (TSR) is kept constant and corresponding to the maximum power capture (efficiency) of the rotor into the wind. The concept of peak efficiency is illustrated by point 28 on curve 25 of FIG. 5. In this modality, the torque T (FIG. 2) rises with the square of the wind speed W (i.e., from points 11 to 12 in FIG. 2), while the power P (FIG. 3) rises with the cube of the wind speed (i.e., from points 16 to 17 in FIG. 3). Because the rotor is kept into the wind in this modality, φ remains at zero degree, as shown in FIG. 4.

Modality 2:

(Corresponds to the regions between points 2 and 3 on the x-axis of FIGS. 1-4.) When the wind speed is between quasi-rated speed and rated speed, the turbine controller continues to keep the rotor into the wind, i.e., at zero yaw angle, while the shaft torque T is held constant at rated value (i.e., from points 12 to 13 in FIG. 2), so the rotor running speed increases proportionally to the wind speed (FIG. 1 as points 7 to 8) and the power P also increases proportionally to the wind speed (i.e., from points 17 to 18 in FIG. 3). In this modality, the TSR increases versus the wind speed and the Cp, due the quasi flat curve Cp versus TSR, decreases a little from its maximum value along the Cp versus TSR curve 25 (i.e., from points 28 to 29 along curve 25 in FIG. 5).

Modality 3:

(Corresponds to the regions between points 3 and 4 on the x-axis of FIGS. 1-4.) When the wind speed is between rated wind speed and quasi-cut-out speed, the yaw angle is changed, gradually and proportionally to the wind speed, in order to allow the turbine to increase gradually the power output, beyond the rated value, as the wind speed increases. In this range the incident wind power is higher than that corresponding to the size of the turbine. Thus the turbine is yawed to reduce the efficiency of the rotor. This is shown in FIG. 1, where the Cp versus TSR curve shifts down (i.e., from points 29 to 30 in FIG. 5) where the point 29 is on the curve Cp versus TSR at zero yaw angle (25), while the point 30 is on the curve Cp versus TSR (26), at a higher yaw angle. The change in the yaw angle is illustrated as movement between points 22 and 23 in FIG. 4. Additionally, the turbine controller continues to keep the torque T at its rated value (i.e., from points 13 to 14 in FIG. 2) and allows an increase in running speed N versus the wind speed W (i.e., from points 8 to 9 in FIG. 1). Thus, in this region the power P increases proportionally with wind speed (i.e., from points 18 to 19 in FIG. 3), which the turbine controller can accept to cover safely any transient, e.g., due to extreme conditions.

Modality 4:

(Corresponds to the regions between points 4 and 5 on the x-axis of FIGS. 1-4.) When the wind speed is between quasi-cut-out and cut-out, the turbine controller keeps the torque T at rated value (i.e., from points 14 to 15 in FIG. 2) and, by increasing the yaw angle (i.e., from points 23 to 24 in FIG. 4), keeps the running speed constant at its max value (i.e., from points 9 to 10 in FIG. 1). Because the torque and the running speed are constant, the power also remains constant (i.e., from points 19 to 20 in FIG. 3). The end result is that the increase in yaw angle causes the Cp versus TSR reduce curve to be further reduced (i.e., from points 30 to 31 in FIG. 5) as the turbine reaches cutout, corresponding to φ approximately equal to 60 degrees.

Control Diagrams

In reality, it is not practicable to directly measure the incident wind speed on the rotor. Rather the control systems rely on measurements of the sensed electrical power (generator output), sensed rotor running speed (as measured with electrical pick-ups in the rotor shaft) and sensed yaw angle (that is the wind direction relative to rotor axis direction as measured with a vane mounted on the nacelle). Using this information, the turbine can optimize performance using only two interconnected control loops: the first loop (drivetrain restraining torque subsystem) controls the restraining electrical torque on the rotor shaft, and the second loop (yaw actuation subsystem) controls the yaw angle between rotor axis and wind direction through a yaw actuating system. The drivetrain restraining torque subsystem is typically based on an electrical generator coupled to an electrical converter. The concepts of restraining electrical torque are generally known in the field of electric motors and generators. An example of restraining electrical torque for controlling an electric machine can be found at U.S. Pat. No. 6,094,364, which is incorporated by reference herein in its entirety. The yaw actuation subsystem can be hydraulically or electrically actuated. Additional details of the yaw actuation subsystem may be found in PCT/US2012/36637, "Systems for Minimizing Yaw Torque Needed to Control Power Output in Two-Bladed, Teetering Hinge Wind Turbines that Control Power Output by Yawing" filed May 4, 2012, and incorporated by reference herein in its entirety.

Figure 8:
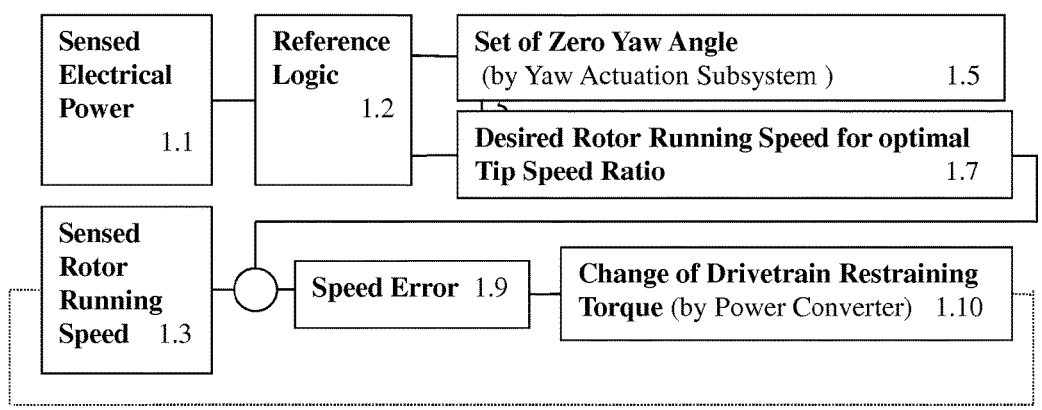
FIG. 8 is a control diagram for operation at output powers less than the quasi-rated power.
Figure 9:
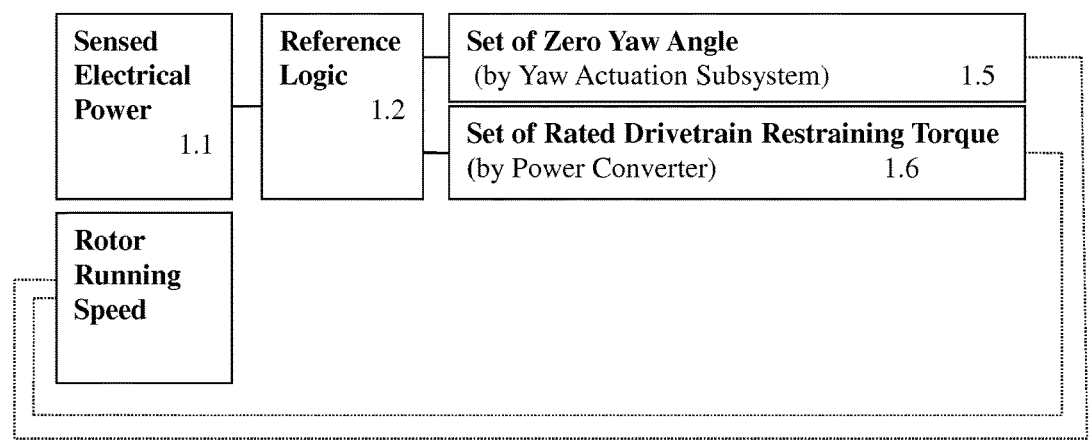
FIG. 9 is a control diagram for operation at output powers greater than the quasi-rated power and less than the rated power.
Figure 10:
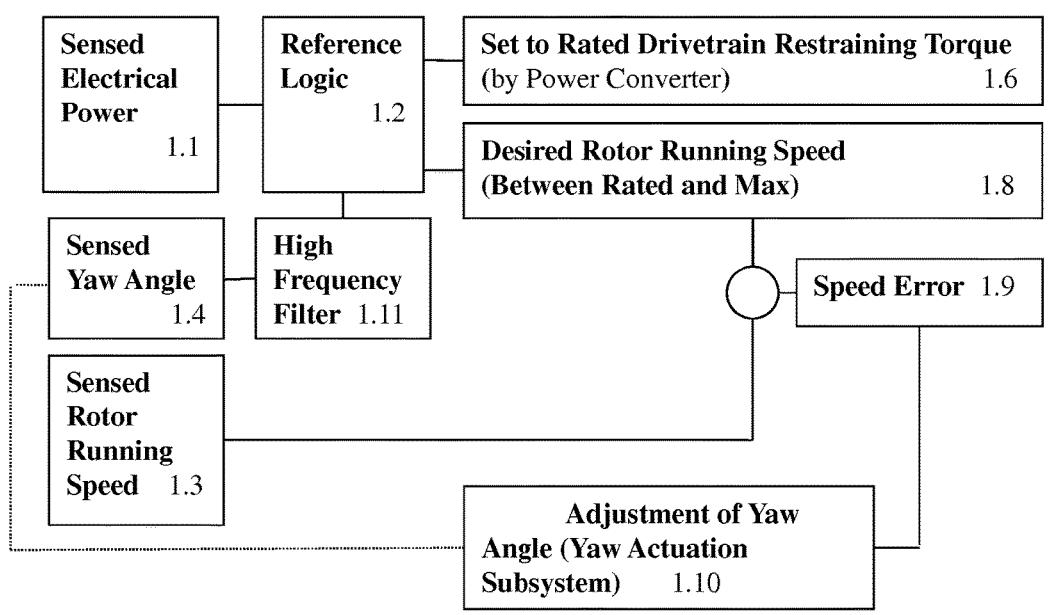
FIG. 10 is a control diagram for operation at output powers greater than the rated power and less than or equal to the max power.

While multiple embodiments of the invention are possible, operational modes of the power management system, based upon restraining torque control and yaw control, are described in FIGS. 8-10. In the range from cut-in to the quasi-rated wind speed, the goal is to maximize the rotor efficiency: hence the controller keeps the rotor into the wind and varies the torque in order to keep TSR corresponding to the max Cp. In the range between the quasi-rated wind speed and the rated wind speed, the goal is to maximize the power while meeting the rated torque limit: hence the controller keeps the rotor into the wind and allows slight increases in the running speed up to a running speed value which allows for safely shutdown of the turbine in case of extreme operating conditions. In the range between the rated wind speed and the quasi-cut-out, the target is to raise the power above the rated power under the constraint of the rated torque: hence the controller allows additional increases in running speed and reacts to the increases of the wind speed by yawing the turbine out of the wind with a yaw angle varying proportionally to the wind speed. In the wind speed range between the quasi-cut-out and the cut-out, the controller maintains the rated torque and the max rotor running speed, corresponding to the design peak power of the turbine. In all cases, the design maximum rotor running speed is set to consider the overshoot the rotor can experience, during a transient caused by a gust or a shutdown (which is actuated by yawing the rotor to 90 degrees from wind direction).

Operation of the power control system at sensed powers less than quasi-rated power is shown in FIG. 8. When operating in this mode, the reference logic 1.2 receives a value of the sensed electrical power 1.1, and uses it to calculate the desired yaw angle and desired rotor running speed. In this case the yaw angle will be set to zero 1.5 and the desired rotor running speed will be that needed to optimize TSR 1.7. The desired rotor running speed is then compared to the sensed rotor running speed 1.3. If the speeds do not match, a speed error 1.9 is generated, at which point the controller changes the restraining torque 1.10 in order to bring the sensed rotor running speed 1.3 and the desired rotor running speed into agreement. Thus, when operating in this mode, the turbine maximizes efficiency in capturing wind energy and converting it to electrical energy.

Operation of the power control system at sensed powers greater than the quasi-rated power and less than the rated power is shown in FIG. 9. When operating in this mode, the reference logic 1.2 receives a value of the sensed electrical power 1.1, and demands to set the yaw angle to zero 1.5 and to hold the rotor torque constant at its rated value. Because the yaw angle and torque are constant, the rotor running speed is only a function of the wind speed. In this mode, the turbine maximizes electrical energy output by maintaining the torque at the rated value.

Operation of the power control system at sensed powers greater than the rated power and less than or equal to the max (maximum) power is shown in FIG. 10. When operating in this mode, the reference logic 1.2 receives a value of the sensed electrical power 1.1, and on this basis calculates the desired rotor running speed in the range between rated and maximum speed 1.8 and demands to set the rated retaining torque 1.6. The desired rotor running speed is then compared to the sensed rotor running speed 1.3. If the speeds do not match, a speed error 1.9 is generated, at which point the controller changes the yaw angle 1.10 in order to bring the sensed rotor running speed 1.3 and the desired rotor running speed into agreement. In some embodiments, the reference logic 1.2 will also receive a measurement of a sensed yaw angle 1.4, which is used to calculate the desired rotor running speed 1.8. Thus, when operating in this mode, the turbine maximizes electrical production by allowing the power production to exceed the rated value.

Thus, using the disclosed systems it is possible to maximize the power production of a two-bladed teetering hinge, yaw controlled wind turbine.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

The invention claimed is:

1. A power control system for optimizing power production from a yaw controlled two-bladed wind turbine,
wherein the wind turbine is programmed, through a controller, a yaw actuation subsystem and a drivetrain restraining torque subsystem, and by using sensed output power of the wind turbine, sensed rotor running speed of the wind turbine and sensed wind direction relative to rotor axis direction of the wind turbine, to determine an optimal operational mode based on a level of the output power,
wherein when the sensed output power has a value that is less than power of the wind turbine at rated rotor torque of the wind turbine, the controller is programmed to:
instruct the yaw actuation subsystem to maintain the rotor axis aligned with the wind, so as to have a yaw angle that is zero;
calculate rotor running speed corresponding to a desired Tip Speed Ratio (TSR);
compare the calculated rotor running speed to the sensed rotor running speed; and
instruct the drivetrain restraining torque subsystem to change the drivetrain restraining torque until actual rotor running speed reaches the calculated value corresponding to the optimal desired TSR.

2. The power control system of claim 1, wherein the yaw actuation subsystem is hydraulic or electrical and the drivetrain restraining torque subsystem comprises an electrical generator coupled to an electrical converter.

3. The power control system of claim 1, wherein the wind turbine has two blades and a teetering hub.

4. A power control system for optimizing power production from a yaw controlled two-bladed wind turbine,
wherein the wind turbine is programmed, through a controller, a yaw actuation subsystem and a drivetrain restraining torque subsystem, and by using sensed output power of the wind turbine, sensed rotor running speed of the wind turbine and sensed wind direction relative to rotor axis direction of the wind turbine, to determine an optimal operational mode based on a level of the output power,
wherein when the sensed output power is greater than power of the wind turbine at rated wind speed but less than power of the wind turbine at cut-out wind speed, the controller is programmed to:
instruct the drivetrain restraining torque subsystem to maintain the drivetrain restraining torque constant and at its rated value;
calculate a desired rotor running speed, which shall be between rated rotor running speed and maximum rotor running speed, based on power level and sensed yaw angle;
compare the desired rotor running speed to the sensed rotor running speed; and
instruct the yaw actuation subsystem to change the yaw angle until the sensed rotor running speed reaches the desired rotor running speed.

5. The power control system of claim 4, wherein when the sensed output power is substantially at the power at cut-out, the controller is programmed to:
instruct the drivetrain restraining torque subsystem to maintain the drivetrain restraining torque constant and at its rated value;
set the desired rotor running speed to the maximum running speed;
compare the maximum rotor running speed with the sensed rotor running speed; and
instruct the yaw actuation subsystem to change the yaw angle until the sensed rotor running speed and the maximum rotor running speed are substantially equal.

6. The power control system of claim 4, wherein the yaw actuation subsystem is hydraulic or electrical and the drivetrain restraining torque subsystem comprises an electrical generator coupled to an electrical converter.

7. The power control system of claim 4, wherein the wind turbine has two blades and a teetering hub.

* * * * *